Aug. 7, 1923.

W. KENNEDY

CLUTCH MECHANISM

Filed May 23, 1921

1,464,077

2 Sheets-Sheet 1

WITNESSES
J. Herbert Bradley

INVENTOR
Walter Kennedy
by Dennis D. Wolcott
atty

Aug. 7, 1923.

W. KENNEDY 1,464,077

CLUTCH MECHANISM

Filed May 23, 1921

2 Sheets-Sheet 2

Patented Aug. 7, 1923.

1,464,077

UNITED STATES PATENT OFFICE.

WALTER KENNEDY, OF PITTSBURGH, PENNSYLVANIA.

CLUTCH MECHANISM.

Application filed May 23, 1921. Serial No. 471,752.

*To all whom it may concern:*

Be it known that I, WALTER KENNEDY, residing at Pittsburgh, in the county of Allegheny and State of Pennsylvania, a citizen of the United States, have invented or discovered certain new and useful Improvements in Clutch Mechanism, of which improvements the following is a specification.

The invention described herein relates to an improvement in clutch mechanism, adapted to so connect independent rotating members as the wheels of an automobile to a common driving member, that the wheels simultaneously and equally driven on one wheel, may rotate independent of the other.

The invention is hereinafter more fully described and claimed.

Figure 1:
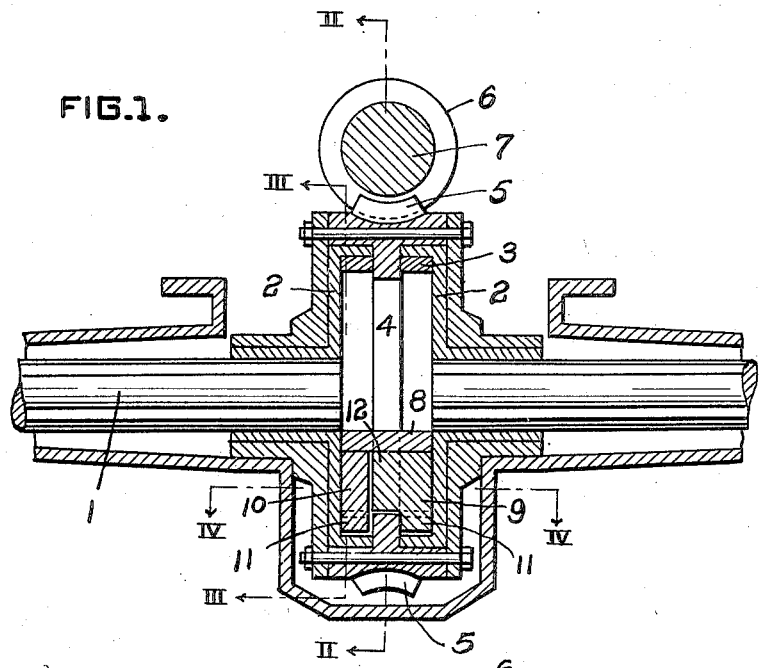
Figure 2:
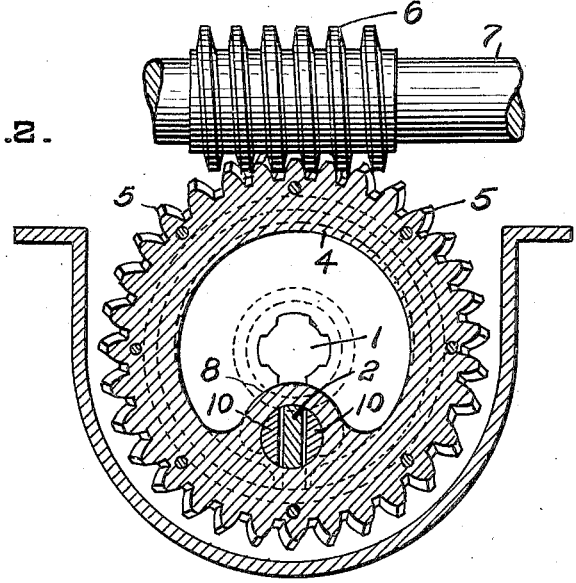
Figure 3:
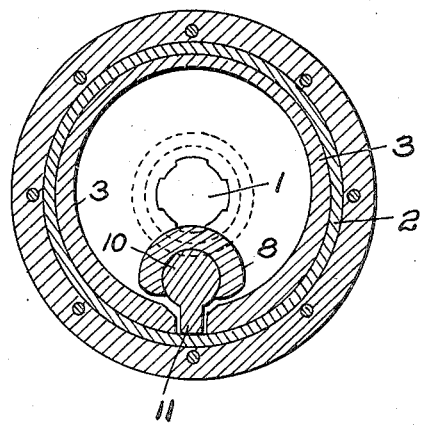
Figure 4:
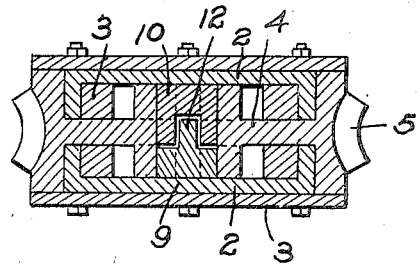
Figure 5:
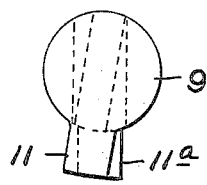

In the accompanying drawings forming a part of this specification, Fig. 1 is a sectional elevation showing my improved clutch connecting the transmission shaft to the axle of the driving wheels of an automobile; Fig. 2 is a sectional view on a plane indicated by the line II—II, Fig. 1; Figs. 3 and 4 are sectional views on planes indicated by the lines III—III and IV—IV, Fig. 1; and Fig. 5 is a detail view of the combined locking and transmitting bolt.

In the combination shown herein, the driving wheels of the automobile are secured to the outer ends of shafts, carrying at their inner ends, parts or members with which other parts or members driven by the motor, can be caused to engage. In the mechanism shown, recessed discs or cups 2 are affixed to the inner ends of the shafts 1, and within each of these cups is arranged a resilient expansible member 3, made in the form of a split ring having such an external diameter that normally it can move freely in the cup, but if slightly expanded, as hereinafter described, it will frictionally engage the inner periphery of the cup. The driving member of the clutch is arranged intermediate of the cups, said member being made in the construction shown herein, in the form of disc 4, having its outer periphery constructed as with teeth, 5, so as to be positively engaged by a worm 6 on the transmission shaft 7. This disc is provided with eccentrically arranged hubs 8, which, when the parts of the clutch are assembled, project into the rings 3, and form bearings for the transmitting bolts 9 and 10. These bolts are provided with wings 11 which extend through slots in the hubs and project in between the ends of the split rings 3.

The slots in the hubs are made of sufficient width to permit of the bolts turning on their axes, so that the wings 11 will be caused to assume an angular position between the ends of the spring ring or member 3, when the bolts are carried around by the rotation of the disc 4. This shifting of the wings to an angular position will force the ends of the rings apart, and thereby cause the peripheries of the rings to frictionally engage the cups. By reference to Figs. 2 and 3, it will be seen that the wings will assume an angular or locking position regardless of the direction of rotation of the driving disc, and that when the wings are in a radial position there will be no expansion of the rings, and the latter can move freely within the cup, or the cup can rotate freely around the rings.

When the automobile is moving in a straight or approximately straight line and the disc rotating in the direction of the arrow in Figs. 2 and 3, both wings will be in the same angular position, and cause the rings to have an approximately equal frictional engagement with the cups, but as soon as one wheel is accelerated as by a turning movement of the automobile, there will be a change in the angular position of one of the wings, thereby lessening the frictional engagement of the ring controlled by such wing with its cup.

In order to prevent an opposite engagement of the two rings with their cups, provision is made to control the position of one ring by the other. In the construction shown, a fin 12 is formed in the inner end of one bolt as 9, and the inner end of the other bolt is slotted for the reception of such fin. The fin and slot are made of such relative widths that when one wing is in angular position and its ring in engagement with the cup of one wheel, a more rapid movement of the other wheel with its cup in the same direction cannot shift the wing controlling the ring in the latter in the opposite direction, beyond radial position, or the position permitting the ring to return to normal or unlocking position.

The controlling of the position of one wing by the other will be readily understood by reference to Fig. 5. In Fig. 5 the wing designated as 11 is shown in the position both wings would occupy when the machine is moving in a straight line or both of the driven wheels equally effective in moving the machine. If the machine should pass around a sharp curve, so that one wheel would rotate much faster than the driving disc, the cup of such wheel and its ring would move relative to the cup and ring of the other wheel, and change the angle of the wing controlling such ring towards position, as shown at 11ª. If the acceleration of the wheel should be great, the wing might be shifted to an angular position, the reverse of that of the wing of the slower moving wheel, and thereby suddenly check and lock the faster wheel. Such a locking of the wheels in opposite directions is prevented by the interengagement of the bolts 9 and 10, as when one wing cannot be shifted beyond radial or unlocking position, without at the same time unlocking the first wing.

It is characteristic of my improved clutch that it is very simple in construction, there being only a few parts and they can be made sufficiently strong to safely transmit any desired power to the wheels.

I claim herein as my invention:

1. In a clutch mechanism, the combination of two shafts, expansible resilient rings adapted when expanded to engage said shafts, a driving member, and means carried by said member for expanding said rings and forming driving connections between the driving member and the rings.

2. In a clutch mechanism, the combination of two shafts, expansible rings, adapted when expanded to engage said shafts, a driving disc and bolts eccentrically mounted in opposite sides of said disc and provided with wings projecting between the ends of said rings.

3. In a clutch mechanism, the combination of two shafts, expansible rings adapted when expanded to engage said shafts, a disc, bolts eccentrically mounted in said disc, means interposed between the bolts for limiting their independent movement, and wings carried by the bolts projecting between the ends of the rings.

In testimony whereof I have hereunto set my hand.

WALTER KENNEDY.